United States Patent Office 3,159,660
Patented Dec. 1, 1964

3,159,660
CYCLOPENTADIENYL IRON DICARBONYL ACYLS
Rex D. Closson, Northville, and Thomas H. Coffield, Farmington, Mich., assignors to Ethyl Corporation, New York, N.Y., a corporation of Virginia
No Drawing. Filed Apr. 9, 1962, Ser. No. 185,821
6 Claims. (Cl. 260—439)

This invention relates to novel organometallic compounds. More specifically, this invention relates to novel acyl compounds of iron wherein the iron atom is also bonded to a cyclopentadienyl ring, and to two carbonyl groups. This application is a continuation-in-part of application Serial No. 801,996, filed March 26, 1959, now Patent No. 3,029,266, which in turn is a continuation-in-part of application Serial No. 645,675, filed March 13, 1957, now abandoned.

An object of this invention is to provide a novel class of acyl iron derivatives. Another object is to provide a new class of cyclopentadienyl iron compounds. A further object is to provide a novel class of iron carbonyls. Still another object is to provide processes for the formation of the novel compounds.

The objects of this invention are accomplished by providing novel compounds having the formula

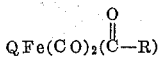

wherein Q is a cyclopentadienyl radical having 5 to about 13 carbon atoms and R is a hydrocarbon radical having one to about 10 carbon atoms.

The cyclomatic radical, Q, may be the cyclopentadienyl radical or a substituted derivative thereof. The preferred substituents are hydrocarbon radicals containing only carbon and hydrogen. However, other substituents such as keto, carboxy, sulfoxy, halide and ethoxy radicals may be bonded to the cyclopentadienyl ring.

One class of applicable substituted cyclopentadienyl radicals may be depicted as follows:

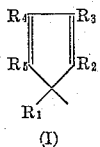

(I)

wherein $R_1$, $R_2$, $R_3$, $R_4$, and $R_5$ are selected from the class consisting of hydrogen and hydrocarbon radicals. Thus, this class of radical can contain one or more hydrocarbon radicals having one to about eight carbon atoms. Preferably the ring is mono-substituted or at most, disubstituted. In any event, the total number of carbon atoms in the substituent radicals does not exceed about eight carbon atoms.

The hydrocarbon substituents represented by the various R's in the above formula may be alkyl, aryl, alkenyl, cycloalkenyl, cycloalkyl, alkaryl and aralkyl radicals. Typical hydrocarbon substituents are the methyl, ethyl, isopropyl, tert-butyl, octyl, 2,2,4-trimethylpentyl, isopropenyl, 3-hexenyl, cyclohexyl, methylcyclohexyl, cyclohexenyl, phenyl, ethylphenyl, mesityl, tolyl, benzyl and phenylethyl radicals.

Illustrative but not limiting examples of the class of cyclomatic radicals illustrated by the structural formula above are the methylcyclopentadienyl, dimethylcyclopentadienyl, tert-butylcyclopentadienyl, isopropenylcyclopentadienyl, cyclohexylcylclopentadienyl, phenylcyclopentadienyl, benzylcyclopentadienyl, 2,3 - xylenylcyclopentadienyl and the octacyclopentadienyl radicals. The preferred radicals are the alkyl substituted cyclopentadienyl radicals. A preferred radical is the methylcyclopentadienyl radical. The most preferred radical is the unsubstituted cyclopentadienyl radical where all the R's in Fig. I are hydrocarbon radicals.

The cyclopentadienyl radical may be present in a fused ring system. These radicals are illustrated by the following formulas:

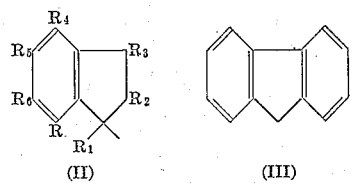

(II)   (III)

Radicals illustrated by (II) are indenyl derivatives, radicals of type (III) are fluorenyl derivatives. The substituents represented by the various R's have the same configuration as the substituents in the radicals illustrated by Fig. I.

The applicable indenyl radicals contain up to about 13 carbon atoms. The fluorenyl radical contains 13 carbon atoms. The preferred radicals are the indenyl derivatives. The preferred radical is the indenyl radical (all the R's in Fig. II are hydrogen radicals).

Another class of applicable radicals containing the cyclopentadienyl configuration are illustrated by the formula below.

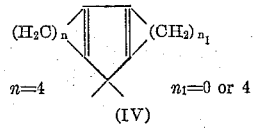

(IV)

Thus, radicals such as the tetrahydroindenyl and octahydrofluorenyl radicals are applicable in the instant invention. The tetrahydroindenyl radical may contain hydrocarbon substituents similar to those which may be bonded to the indenyl radical.

The preferred cyclopentadienyl radicals are the cyclopentadienyl radical and the monoalkyl substituted and dialkyl-substituted radicals illustrated by Fig. I. The most preferred radicals are the cyclopentadienyl and methylcyclopentadienyl radicals.

As mentioned in column 1, the novel compounds of this invention are acyl iron derivatives, that is, a

radical is bonded to an iron atom.

The R group in the acyl radical within the novel compounds contains one to about 10 carbon atoms. Preferably, R is a hydrocarbon radical; however, other substituents such as halide, alkoxy, keto and carboxy groups may be bonded to a carbon atom within the carbon skeleton of the radical.

The hydrocarbon radicals represented by R in the acyl group

may be alkyl, aryl, alkenyl, cycloalkenyl, cycloalkyl, alkaryl and aralkyl radicals.

Typical hydrocarbon substituents are methyl, ethyl, isopropyl, octyl, decyl, 4-hexenyl, methylcyclohexyl, 1,3-cyclohexadienyl, phenyl, ethylphenyl, and tolyl radicals. The preferred radicals are the alkyl and aryl radicals. The most preferred radicals are the methyl and phenyl radicals. The acyl derivatives derived from these preferred radicals are the acetyl and benzoyl radicals. The most preferred acyl radical is the acetyl radical.

Typical compounds of this invention are cyclopentadienyl dicarbonyl acetyl iron, methylcyclopentadienyl dicarbonyl acetyl iron, cyclopentadienyl dicarbonyl benzoyl iron, indenyl dicarbonyl trifluoroacetyl iron, cyclopentadienyl dicarbonyl trifluoroacetyl iron, octylcyclopentadienyl dicarbonyl 3-cyclohexylbutyryl iron and the like.

Although directed to iron, it is to be understood that similar compounds of ruthenium and osmium are also within the scope of this invention.

The compounds of this invention are prepared by a process which is illustrated by the following preparation of cyclopentadienyl dicarbonyl acetyl iron.

(A) 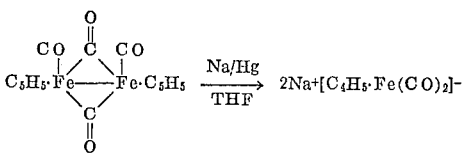

(B) 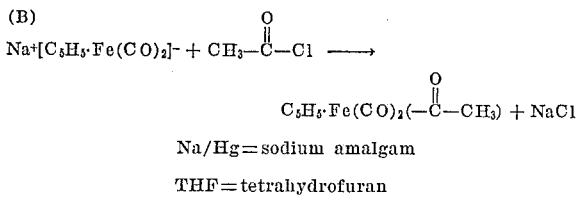

Na/Hg = sodium amalgam

THF = tetrahydrofuran

Thus, the novel compounds of this invention are prepared by a process which comprises reacting a dicyclopentadienyl diirn tetracarbonyl compound having the formula $$Q_2Fe_2(CO)_4$$

wherein Q is a cyclopentadienyl radical having 5 to about 13 carbon atoms with an alkali metal and subsequently reacting the intermediate thus formed with an acylating agent.

As illustrated by Reaction A above, the starting materials for the compounds of this invention are the dicyclopentadienyl diiron tetracarbonyl compounds wherein the two cyclopentadienyl radicals have 5 to about 13 carbon atoms as previously described. These compounds donate the cyclopentadienyl radical and two carbonyl groups to the compounds of this invention. Hence, the choice of the starting material will govern the nature of the cyclopentadienyl radical present in the novel compounds. The most preferred starting compound is dicyclopentadienyl diiron tetracarbonyl.

The starting material is transformed into a reactive intermediate by treatment with an alkali metal according to the reaction illustrated in Reaction A above. The alkali metal is conveniently reacted as a dispersion in an inert carrier or as an amalgam. The amalgam is preferred as its use ordinarily gives an easily conductible reaction and a higher yield of alkali metal cyclopentadienyl iron dicarbonyl compound. The alkali metals include lithium, sodium, potassium, rubidium, cesium and francium. Of these, lithium, sodium and potassium are most applicable to the preparation of the alkali metal containing intermediate. Sodium is particularly preferred as it is readily available and high yields of the compounds of this invention can be prepared from the intermediate containing this metal. The alkali metal containing intermediate may also be prepared by reaction of an alkali metal alloy such as a potassium-sodium alloy or a lithium-sodium alloy.

The acyl iron dicarbonyl compounds of this invention are prepared from the alkali metal cyclopentadienyl iron dicarbonyl compound by reaction of that intermediate with an organic acylating agent as illustrated in Reaction B above. In Reaction B, the alkali metal of the alkali metal cyclopentadienyl iron dicarbonyl compound is replaced with an acyl group. A by-product is an alkali metal salt.

The acylating agent used in Reaction B can be an acyl halide such as an alkyl carbonyl halide, an aryl carbonyl halide, an aralkyl carbonyl halide, or an alkaryl carbonyl halide. These compounds have the general formula

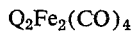

wherein R has one to 10 carbon atoms as defined previously within this specification, column 1, and X is selected from the group consisting of fluorine, chlorine, bromine and iodine. Preferred acyl halides for use in our process are those in which R contains only single and double carbon-to-carbon bonds and does not contain any triple bonds. The preferred acyl halides react readily with the alkali metal cyclopentadienyl iron dicarbonyl intermediate to give high yields of the acyl cyclopentadienyl iron dicarbonyl compounds provided by this invention.

Typical acyl halides which may be used in our process are propionyl chloride, p-iodobenzoyl bromide, p-phenoxyphenyl acetyl iodide, p-nitrosobenzoyl bromide, propionyl bromide, stearoyl chloride and the like. The most preferred acyl halide is acetyl chloride. The preferred halide radicals in these acyl halides are chloride and bromide. The most preferred halide radical is the chloride radical, since acyl chlorides are economical and furnish high yields of the compounds of this invention.

Other acylating agents such as certain acid anhydrides also react with alkali metal cyclopentadienyl iron dicarbonyl compounds to form the cyclopentadienyl iron dicarbonyl acyl compounds. Thus, trifluoroacetic anhydride reacts readily with an alkali metal iron cyclopentadienyl iron dicarbonyl to form cyclopentadienyl iron dicarbonyl trifluoroacetyl.

The reaction between an alkali metal and the dicyclopentadienyl diiron tetracarbonyl compound is conveniently carried out in an ether solvent. It has been found that high yields of the alkali metal cyclopentadienyl iron dicarbonyl intermediate are obtained when the ether solvent has a boiling point in excess of 25° C. The cyclic ethers have been found to give excellent yields of this intermediate, and constitute a preferred class of solvents in this invention. Acyclic monodentate, dibentate and tridentate ethers are also applicable. Illustrative ethers of these types are dibutylether, dimethoxyethane, dipropylether, diethyleneglycol dimethylether and the like. Such ethers as tetrahydrofuran and dioxane are preferred solvents. The reaction between an alkali metal cyclopentadienyl iron dicarbonyl compound and an acylating agent is also conveniently conducted in an ether solvent. Hence, it is not necessary to isolate the intermediate formed in Reaction A above in order to prepare the compounds of this invention according to Reaction B.

Reaction A is often instantaneous but, in order to insure a maximum yield of alkali metal cyclopentadienyl iron dicarbonyl compound, it is often convenient to allow the reaction to continue for up to about one hour. Reaction times of longer duration can be employed if desired, but they ordinarily are not necessary. Reaction B is also rapid and usually is completed within one hour. Ordinarily, a time of about 30 minutes is sufficient in order to form a good yield of the products of this invention. The time of both reactions above is dependent upon the other reaction variables such as the activity of the reactants and the temperature employed.

The process of this invention is preferably conducted in an inert atmosphere. Gases such as nitrogen, argon, neon, krypton and the like are suitable for this purpose. Because it is economical, nitrogen is preferred.

In general, the compounds of this invention are colored crystalline solids. They can be recovered from the reaction mixture and purified according to techniques obvious to one skilled in the art. Examples of such techniques are crystallization, sublimation and chromatography.

In order to illustrate the novel process of this invention and the compounds produced thereby, the following examples are presented. All parts and percentages are by weight unless otherwise noted.

Example I

Eighteen parts of dicyclopentadienyl diiron tetracarbonyl was dissolved in 100 ml. of tetrahydrofuran and the solution treated with 115 parts of five percent sodium amalgam under nitrogen. The clear red solution thus obtained was treated with 22.4 parts of acetyl chloride. A vigorous reaction took place. The mixture was stirred for about 30 minutes and then poured into ice-water. On standing, a solid formed which was filtered and dried. It was then sublimed at 30° C. at one millimeter to give a total of 13.4 parts (60 percent of theory) of cyclopentadienyl acetyl iron dicarbonyl which is a yellow-brown crystalline product having a melting point of 56–58° C. Its infrared spectrum indicates that a ketonic carbonyl is present. Analysis calculated for $C_9H_8FeO_3$: C, 49.2; H, 3.64; Fe, 25.4. Found: C, 49.3; H, 3.71; Fe, 25.2.

Example II

Following the procedure of Example I, di(methylcyclopentadienyl) diiron tetracarbonyl dissolved in dioxane is treated with a potassium amalgam. The resulting solution is treated with benzoyl chloride. The compound, methylcyclopentadienyl dicarbonyl benzoyl iron, is obtained.

Example III

Following the procedure of Example I, di(tert-butylcyclopentadienyl) diiron tetracarbonyl dissolved in dioxane is treated with a sodium dispersion. The resulting solution is then treated with acetyl chloride. The product, tert-butyl cyclopentadienyl dicarbonyl acetyl iron is obtained.

Example IV

Following the procedure of Example I, di(phenylcyclopentadienyl) diiron tetracarbonyl dissolved in dibutylether is treated with sodium amalgam. The resulting solution is treated with p-methylbenzoyl bromide. The compound phenylcyclopentadienyl dicarbonyl p-methylbenzoyl iron is obtained.

Example V

Following the procedure of Example I, di(benzoylcyclopentadienyl) diiron tetracarbonyl dissolved in diethyleneglycol dimethylether is treated with lithium amalgam. The resulting solution is treated with β-cyclohexylpropionyl chloride. The compound benzoylcyclopentadienyl dicarbonyl β-cyclohexylpropionyl iron is obtained.

Example VI

Following the procedure of Example I, di(α-cyclohexyl ethylcyclopentadienyl) diiron tetracarbonyl dissolved in dimethoxyethane is treated with potassium amalgam. The resulting solution is treated with phenylacetyl chloride. The compound α-cyclohexyl ethylcyclopentadienyl dicarbonyl phenylacetyl iron is obtained.

Example VII

Following the procedure of Example I, di(2-methylindenyl) diiron tetracarbonyl dissolved in tetrahydrofuran is treated with potassium amalgam. The resulting solution is treated with trifluoroacetyl bromide. The compound 2-methylindenyl dicarbonyl trifluoroacetyl iron is obtained.

Example VIII

Following the procedure of Example I, di(p-methylphenyl cyclopentadienyl) diiron tetracarbonyl dissolved in diethyleneglycol diethylether is treated with a potassium dispersion. The resulting solution is treated with trifluoroacetic anhydride. The compound p-methylpentyl cyclopentadienyl dicarbonyl trifluoroacetyl iron is obtained.

Example IX

Following the procedure of Example I, di(fluorenyl) diiron tetracarbonyl dissolved in diethyleneglycol dipropylether was treated with potassium amalgam. The resulting solution is treated with benzoyl chloride. The compound fluorenyl dicarbonyl benzoyl iron is obtained.

Example X

Following the procedure of Example I, di(4,5,6,7-tetrahydroindenyl) diiron tetracarbonyl dissolved in dipropoxyethane is treated with sodium amalgam. The resulting solution is treated with 3,5-diethylbenzoyl chloride. The compound 4,5,6,7-tetrahydroindenyl dicarbonyl 3,5-diethylbenzoyl iron is obtained.

The novel cyclopentadienyl acyl iron dicarbonyl compounds of this invention may also be prepared by carbonylation of a cyclopentadienyl iron dicarbonyl hydrocarbon compound. In general, these compounds have the formula

$$QFe(CO)_2R$$

wherein Q and R have the same significance as hereinabove described.

Thus, the novel compounds of this invention can be prepared by a process comprising reacting a compound having the formula

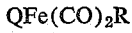

$$QFe(CO)_2R$$

wherein Q is a cyclopentadienyl radical having 5 to about 13 carbon atoms, and R is a hydrocarbon radical having one to about 10 carbon atoms with carbon monoxide, said process being carried out at a temperature within the range of from about 75 to about 400° C., the carbon monoxide pressure being maintained between about 50 to about 4,000 p.s.i.g.

The following examples illustrate this preparation. All parts are parts by weight unless otherwise noted.

Example XI

A solution containing 1.92 parts of cyclopentadienyl methyl iron dicarbonyl in 357 parts of ether was subjected to 3,000 p.s.i.g. of carbon monoxide pressure at 125° C. for two hours. After discharging the autoclave, the solvent was removed under reduced pressure and the residue sublimed between 25 and 40° C. at one millimeter. The sublimate proved to be a mixture of starting material and carbonylated product. Pure cyclopentadienyl acetyl iron dicarbonyl was obtained by dissolving the sublimate in a minimum of N,N'-dimethyl formamide and adding small amounts of water. Since a clear separation was not possible by this method, the yield of 0.43 part represents only an approximate and minimum value. The melting point was 57–58° C. The infrared spectrum of this material shows it to be cyclopentadienyl acetyl iron dicarbonyl.

Similarly, carbonylation of methylcyclopentadienyl iron dicarbonyl methyl, isopropylcyclopentadienyl iron dicarbonyl methyl, phenylcyclopentadienyl methyl, p-methylphenyl cyclopentadienyl iron dicarbonyl methyl, and indenyl iron dicarbonyl methyl yields the compounds methylcyclopentadienyl dicarbonyl acetyl iron, isopropyl cyclopentadienyl dicarbonyl acetyl iron, phenylcyclopentadienyl dicarbonyl acetyl iron, p-methylphenylcyclopentadienyl dicarbonyl acetyl iron, and indenyl dicarbonyl acetyl iron respectively.

Example XII

Following the procedure of Example XI, cyclopentadienyl iron dicarbonyl phenyl is treated with carbon monoxide. The compound cyclopentadienyl dicarbonyl benzoyl iron is obtained.

The procedure exemplified by Examples XI and XII is generally carried out in an ether solvent as hereinbefore described. The reaction temperature is generally within the range of 75° to 400° C. Preferably, it is within the range of 100 to 150° C. The carbon monoxide pressure is maintained between about 50 to about 4,000 p.s.i.g.

The reaction time is generally within the range of one to ten hours. Suitable results are usually obtained in one and one-half to five hours.

The above process has been extended to alkyl, aralkyl and aryl molybdenum compounds as illustrated by the following example in which all parts are parts by weight.

*Example XIII*

A solution of 2.60 parts of cyclopentadienyl methyl molybdenum tricarbonyl in 357 parts of diethylether was pressurized with carbon monoxide to 3000 p.s.i.g. at 125° C. for two hours. Some decomposition occurred and the solution was filtered on discharge from the autoclave. The infrared spectrum of the ether solution showed the presence of a ketonic carbonyl and indicated the presence of cyclopentadienyl acetyl molybdenum tricarbonyl.

The compounds of this invention are useful as chemical intermediates. Many of the compounds are effective antiknock agents when added to gasoline fuels used in the separation of spark ignition internal combustion engines. The compounds are also valuable sources of iron metal and can be used as vapor phase metal plating agents by pyrolitically decomposing the compounds to deposit an iron-containing layer upon a heated substrate. The compounds are also useful as additives to petroleum lubricants. Many of the compounds also find utility in biocidal applications, e.g., as fungicides, herbicides and pesticides.

Having fully described this invention, it is intended that it be limited to only the spirit and scope of the appended claims.

We claim:

1. Compounds having the formula

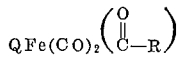

wherein Q is a cyclopentadienyl radical having 5 to about 13 carbon atoms and R is a hydrocarbon radical having one to about 10 carbon atoms.

2. Cyclopentadienyl dicarbonyl acetyl iron.

3. Process for the formation of compounds having the formula

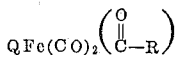

wherein Q is a cyclopentadienyl radical having 5 to about 13 carbon atoms and R is a hydrocarbon radical having one to about 10 carbon atoms, said process comprising reacting a dicyclopentadienyl diiron tetracarbonyl compound having the formula

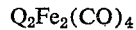

$Q_2Fe_2(CO)_4$ with an alkali metal and subsequently reacting the intermediate thus formed with an acyl halide having the formula

wherein R is as defined above and X is a halogen.

4. Process for the formation of cyclopentadienyl dicarbonyl acetyl iron, said process comprising reacting dicyclopentadienyl diiron tetracarbonyl with sodium and subsequently reacting the intermediate thus formed with acetyl chloride.

5. Process for the formation of compounds having the formula

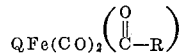

said process comprising reacting a compound having the formula $QFe(CO)_2R$ wherein Q is a cyclopentadienyl radical having 5 to about 13 carbon atoms, and R is a hydrocarbon radical having one to about 10 carbon atoms with carbon monoxide, said process being carried out at a temperature within the range of from about 75 to about 400° C., the carbon monoxide pressure being maintained between about 50 to about 4,000 p.s.i.g.

6. Process for the formation of cyclopentadienyl dicarbonyl acetyl iron, said process comprising reacting cyclopentadienyl iron dicarbonyl methyl with carbon monoxide, said process being carried out at a temperature of 125° C. and under 3,000 p.s.i.g. of carbon monoxide pressure.

References Cited in the file of this patent

UNITED STATES PATENTS 2,913,413    Brown                Nov. 17, 1959

OTHER REFERENCES

Piper et al.: Journal of Inorganic and Nuclear Chemistry, vol. 3 (1956), pages 104–124.